United States Patent
Nguyen

(10) Patent No.: US 7,436,263 B2
(45) Date of Patent: Oct. 14, 2008

(54) APPARATUS AND METHOD FOR PRESENTING A MODULATED OUTPUT SIGNAL AT AN OUTPUT LOCUS

(75) Inventor: Khanh Chu Nguyen, Grand Prairie, TX (US)

(73) Assignee: Texas Instruments Incorporated, Dallas, TX (US)

( * ) Notice: Subject to any disclaimer, the term of this patent is extended or adjusted under 35 U.S.C. 154(b) by 801 days.

(21) Appl. No.: 11/012,654

(22) Filed: Dec. 15, 2004

(65) Prior Publication Data

US 2006/0126746 A1 Jun. 15, 2006

(51) Int. Cl.
- H03C 3/00 (2006.01)
- H03D 3/00 (2006.01)
- H03L 7/16 (2006.01)
- H04L 27/10 (2006.01)

(52) U.S. Cl. ............... 331/14; 331/17; 331/23; 331/25; 329/300; 332/100; 375/272

(58) Field of Classification Search .......... 331/1 A, 331/10, 11, 14, 17, 18, 23, 25; 327/156–159; 329/300–303, 325; 332/100–102, 127; 360/51; 375/272–278, 303–307, 334–337, 376; 455/260

See application file for complete search history.

(56) References Cited

U.S. PATENT DOCUMENTS 4,511,858 A * 4/1985 Charavit et al. ............... 331/10

* cited by examiner

Primary Examiner—David Mis
(74) Attorney, Agent, or Firm—Wade J. Brady, III; Frederick J. Telecky, Jr.

(57) ABSTRACT

An apparatus that presents an output signal that is modulated by input signal includes: (a) A signal source providing a signal at a reference frequency. (b) A frequency comparer coupled with the signal source and the output signal for comparing the extant output signal frequency with the reference frequency and generating an indicator representing the comparing. (c) Value storing units coupled with the frequency comparer to respond to an indicator and store a parameter associated with one of predetermined frequencies. (d) A selector coupled with the value storing units. (e) A signal controlled oscillator coupled with the selector. The selector responds to the input signal to couple a value storing unit with the oscillator for providing a parameter to the oscillator for effecting the modulation.

20 Claims, 3 Drawing Sheets

APPARATUS AND METHOD FOR PRESENTING A MODULATED OUTPUT SIGNAL AT AN OUTPUT LOCUS

BACKGROUND OF THE INVENTION

The present invention is directed to an apparatus and method for presenting a modulated output signal at an output locus, such as a signal generator apparatus and a method for its operation. The present invention is especially directed to signal generator apparatuses that are used in connection with modulating an output signal according to at least one characteristic of an input signal. Examples of such modulation are frequency shift keying (FSK) modulation and on-off keying (OOK) modulation, but the present invention is not limited to use with those modulation technologies.

Signal generating circuits, sometimes referred to as frequency synthesizers, commonly operate with their entire functionality operating all the time. That is, synthesizing circuitry is integrally involved with calibrating circuitry, and both synthesizing and calibrating circuitry operate all the time. One result of such an arrangement is that excessive current is used in operating the synthesizer resulting in low efficiency and excessive heat generation.

Prior art synthesizers, for example, apply a transmit data signal (i.e., the signal that is the basis for modulating the synthesizer output signal for a transmitter) to a capacitor network that is employed to pull a crystal off-frequency. This design requires tight tolerances in selecting the crystal and in selecting the capacitors. Tighter tolerances generally translate to higher costs in manufacturing a product.

In contrast, the present invention uses a crystal (or other reference signal source) as a reference only. Moreover, the present invention employs digital signaling to establish frequency levels for effecting the required modulation in direct response to a modulating signal, such as a transmit data signal for a transmitter. The present invention permits operational separation of synthesizing circuitry and calibration circuitry. This permits calibration circuitry to be operated intermittently such as upon occurrence of a particular event, for example on the occasion of beginning a transmitting cycle. Alternatively, calibration circuitry of the present invention may be operated in response to a timer upon the elapsing of a predetermined time interval. Combinations of timed operation and occasion-instituted operation may also be employed with the present invention. For example, calibration may be carried out on commencement of transmitting operations, but may also be instituted according to a timed elapsing of an interval when long periods of transmission occur. Such timed calibration may be employed to guard against wandering of output frequencies over time by a transmitter.

Provision of an independently operated calibration function means that current is not being used by the calibration circuitry at all times during which the apparatus is operating. As a result less current is consumed by the apparatus, there is less heat build-up and the apparatus operates more efficiently.

Basing modulated output frequencies on digital signaling permits use of lesser tolerances in components in the apparatus of the present invention. Calibration at intervals, or on occasions or both at intervals and occasionally further contributes to accommodation of lesser tolerances in constructing a synthesizer using the present invention. Cost of manufacture may be thereby reduced without sacrificing reliability, operating efficiency or accuracy of operation.

There is a need for a frequency synthesizer apparatus that uses less current than prior art synthesizer circuits.

There is a need for a synthesizer circuit that can meet performance criteria using components having less stringent tolerances than are required for prior art synthesizer apparatuses.

SUMMARY OF THE INVENTION

A signal generating apparatus presents an output signal at an output locus that is modulated by at least one characteristic of an input signal received at an input locus. The output signal has an extant frequency selected from a plurality of predetermined frequencies to indicate the at least one characteristic. The apparatus includes: (a) A signal source providing a reference signal at a reference frequency. (b) A frequency comparing unit coupled with the signal source and coupled with the output locus for comparing a presently extant frequency of the output signal with the reference frequency. The frequency comparing unit generates at least one indicator value representing a result of the comparing. (c) A plurality of value storing units coupled with the frequency comparing unit. Each respective value storing unit responds to a respective indicator value to store a respective frequency-related parameter associated with a respective predetermined frequency of the plurality of predetermined frequencies. (d) A selection unit coupled with the plurality of value storing units and coupled with the input locus. (e) A signal controlled oscillator unit coupled with the selection unit and coupled with the output locus. The selection unit responds to the at least one characteristic to couple a selected respective value storing unit with the signal controlled oscillator unit as a connected value storing unit. The connected value storing unit provides a respective frequency-related parameter to the signal controlled oscillating unit for effecting the modulation.

It is, therefore, an object of the present invention to provide an apparatus and method for presenting a modulated output signal at an output locus that uses less current than prior art synthesizer circuits.

It is another object of the present invention to provide an apparatus and method for presenting a modulated output signal at an output locus having less stringent tolerances than are required for prior art synthesizer apparatuses.

Further objects and features of the present invention will be apparent from the following specification and claims when considered in connection with the accompanying drawings, in which like elements are labeled using like reference numerals in the various figures, illustrating the preferred embodiments of the invention.

DETAILED DESCRIPTION OF THE PREFERRED EMBODIMENT

Figure 1:
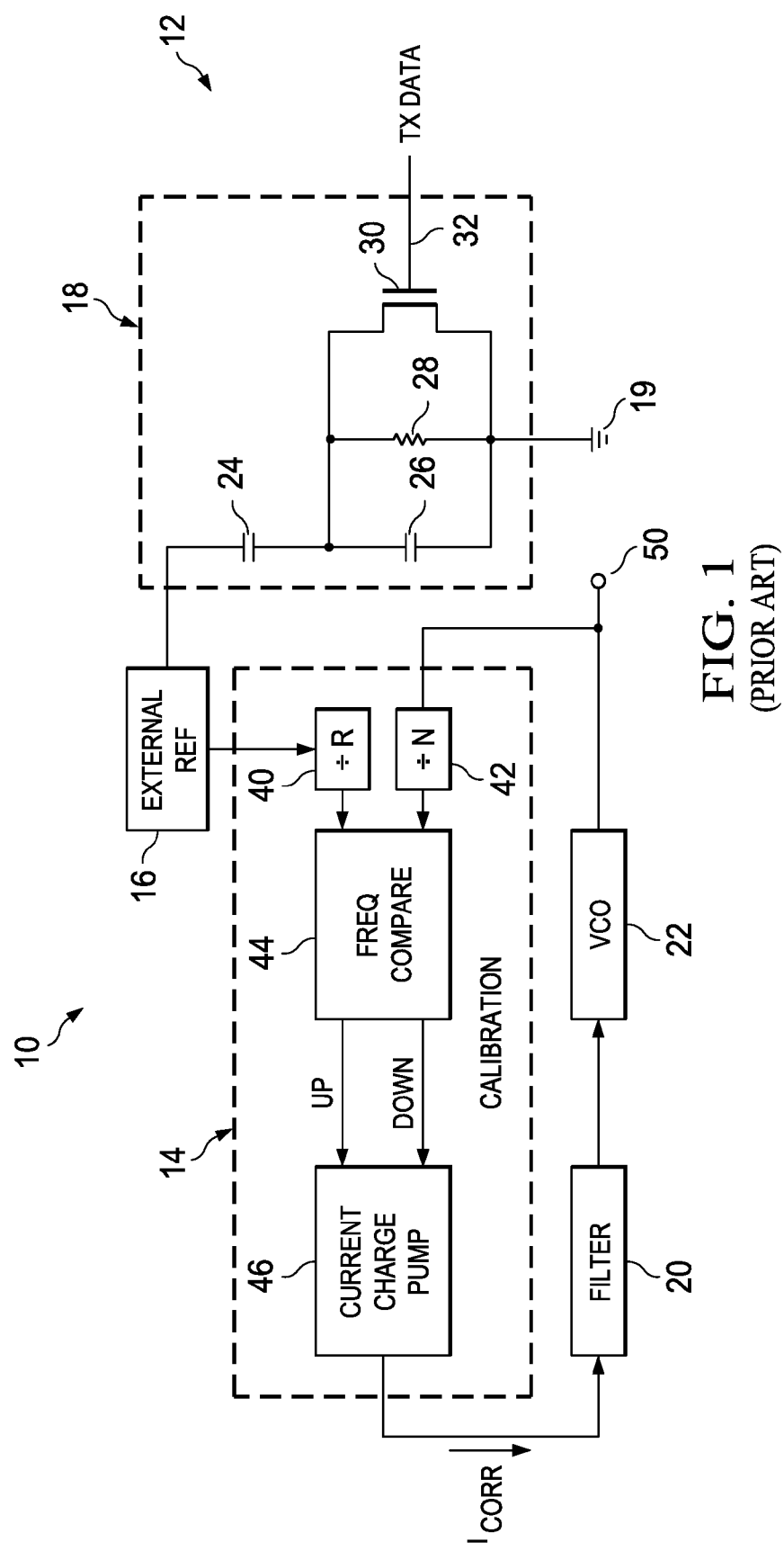
FIG. 1 is an electrical schematic diagram of a prior art signal generating apparatus.

FIG. 1 is an electrical schematic diagram of a prior art signal generating apparatus. In FIG. 1, a signal generating apparatus 10 includes a transmit data modulation network section 12, a calibrating unit section 14, a filter 20 and a voltage-controlled oscillator (VCO) 22. Transmit data modulation network section 12 includes a crystal 16 and a frequency adjusting circuit 18. Frequency adjusting circuit 18 includes capacitors 24, 26 coupled in series between crystal 16 and ground 19. A resistor 28 is coupled in parallel with capacitor 26 between a connection locus 25 (between capacitors 24, 26) and ground 19. A transistor 30 is coupled in parallel with capacitor 26 and resistor 28 between locus 25 and ground 19. Transistor 30 receives a transmission modulating signal TXDATA at its gate 32. Calibrating section 14 includes frequency divider units 40, 42, a frequency comparing unit 44 and a current charge pump 46.

In operation, transmission modulating signal TXDATA varies between a first signal level and a second signal level. When transmission modulating signal TXDATA is at the first signal level, transistor 30 conducts thereby shorting capacitor 26 and including only capacitor 24 in the circuit coupling crystal 16 with ground 19. When transmission modulating signal is at the second signal level, transistor 30 does not conduct thereby including capacitors 24, 26 in the circuit coupling crystal 16 with ground 19. Varying capacitance coupled with crystal 16 effects a pulling of output frequency produced by crystal 16 off-frequency from the normal frequency signal produced by crystal 16. As a result, frequency adjusting circuit 18 effectively uses transmission modulating signal TXDATA to modulate signals produced by crystal 16 and provided to calibrating unit 14.

Calibrating unit 14 corrects anomalies in output signals presented at an output locus 50 (in a manner to be described below) and provides adjusted current signals to filter 20. Filter 20 stabilizes received adjusted current signals and provides a filtered adjusted voltage signal to VCO 22. VCO 22 responds to voltage signals received from filter 20 and presents output signals at output locus 50. Output signals presented at output locus 50 have a frequency representative of the then extant signal level of transmission modulating signal TXDATA.

Calibrating unit 14 receives signals produced by an external reference unit, such as a crystal 16 having a frequency $f_{XTAL}$ at frequency divider unit 40. Frequency divider unit 40 is a divide-by-R frequency divider, where R is a scaling factor that scales frequency $f_{XTAL}$ of crystal 16 to result in a reference frequency $f_{REF}$. Calibrating unit 14 receives the output signal presented at output locus 50 having an extant reference frequency $f_{OUT}$ at frequency divider unit 42. Frequency divider unit 42 is a divide-by-N frequency divider, where N is a scaling factor that scales the frequency $f_{OUT}$ of the output signal to substantially match the frequency $f_{REF}$ of the reference signal. Frequency divider unit 40 provides a signal to frequency compare circuit 44 representing $f_{REF}$ which is an equivalent value of the value $f_{XTAL}/R$. Frequency divider unit 42 provides a signal to frequency compare circuit 44 representing $f_{OUT}/N$. Frequency compare circuit 44 compares signals $f_{XTAL}/R$, $f_{OUT}/N$ and presents an UP signal or a DOWN signal to current charge pump 46 indicating which way frequency $f_{OUT}$ of the output signal must be adjusted for rendering an accurate representation of modulating signal TXDATA. Current charge pump 46 provides a correction current $I_{CORR}$ to filter 20 indicating adjustment necessary to bring frequency $f_{OUT}$ into a predetermined relationship with reference frequency $f_{REF}$ in order to present an accurate representation of modulating signal TXDATA. Filter 20 filters high frequency noise from correction current $I_{CORR}$ and employs correction current $I_{CORR}$ to present a voltage signal to voltage-controlled oscillator (VCO) 22. VCO 22 responds to the voltage signal received from filter 20 to present an output signal at output locus 50 having an output frequency $f_{OUT}$.

Calibration section 14 is continually cooperating with transmit data modulation network section 12 during operation of apparatus 10. That is, calibration section 14 is always using current when apparatus 10 is presenting an output signal having a frequency $f_{OUT}$ representing modulating signal TXDATA. Crystal 16, capacitors 24, 26 and components within filter 20 (not shown in detail in FIG. 1) must be precision components having tight tolerances to ensure accurate and reliable operation of apparatus 10. Apparatus 10 is, therefore, continually generating heat and operating inefficiently because of its continuous use of current by calibrating section 14. Further, apparatus 10 is relatively expensive to manufacture because of its need for a high precision crystal 16, capacitors 24, 26 and filter 20.

Figure 2:
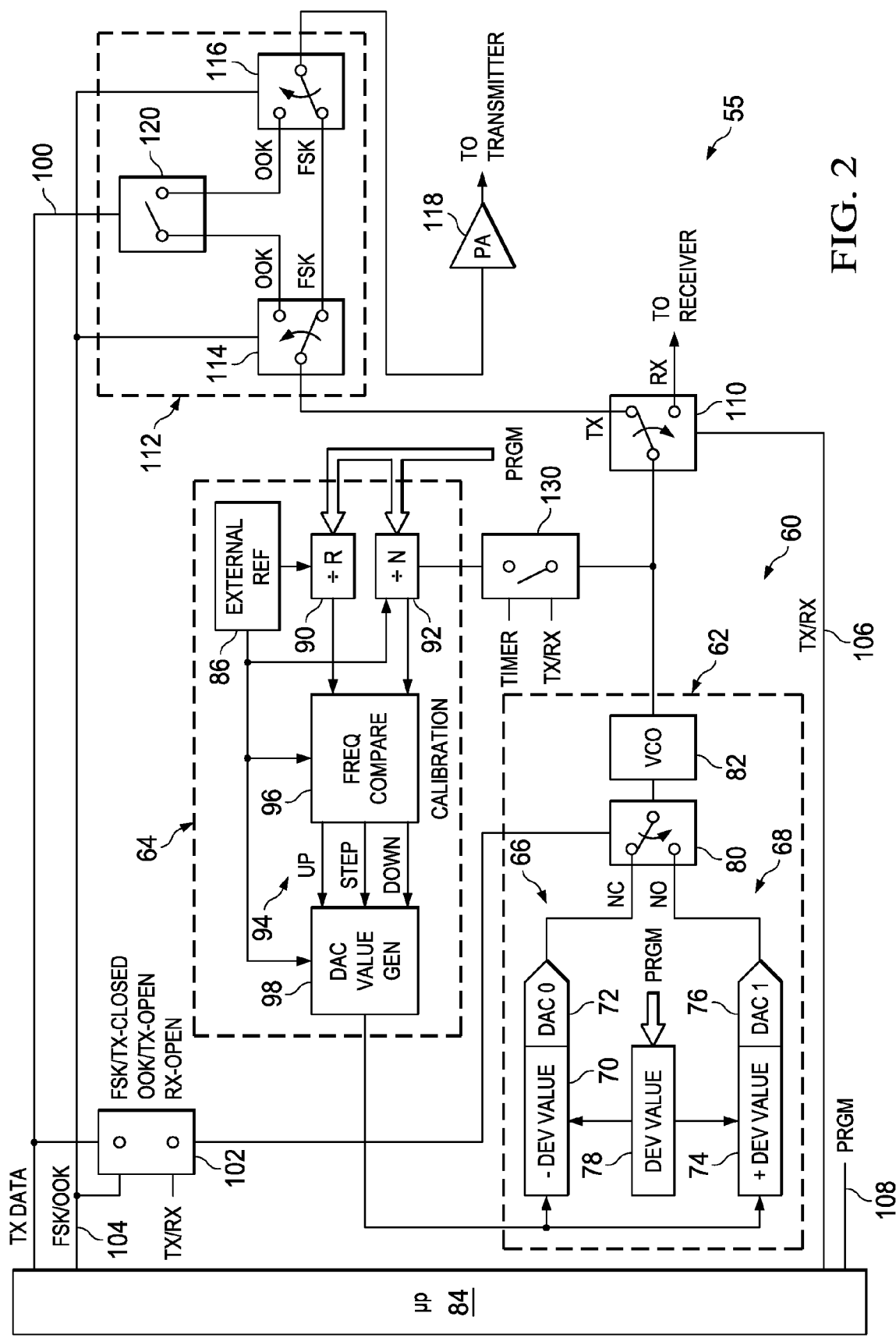
FIG. 2 is an electrical schematic diagram of the signal generating apparatus of the present invention employed in a transceiver apparatus.

FIG. 2 is an electrical schematic diagram of the signal generating apparatus of the present invention employed in a transceiver apparatus. In FIG. 2, a transceiver apparatus 55 includes a signal generating apparatus 60. Signal generating apparatus 60 includes a frequency synthesizing section 62 and a calibrating section 64. Frequency synthesizing section 62 includes a first value storing unit 66, a second value storing unit 68, a selection unit 80 and a signal controlled oscillator unit 82. Signal controlled oscillator unit 82 is preferably embodied in a voltage-controlled oscillator (VCO).

First value storing unit 66 includes a deviation value storing section 70 and a digital-to-analog converter (DAC) 72. Second value storing unit 68 includes a deviation value storing section 74 and a digital-to-analog converter (DAC) 76. A deviation value step storage unit 78 is coupled with deviation value storing units 70, 74. Deviation value step storage unit 78 is coupled with a microprocessor unit 84. Microprocessor unit 84 may employ a programming signal PRGM presented at a terminal or pin 108 to program deviation value step storage unit 78 to change the size of step for each deviation. Programming deviation value step storage unit 78 may effect changing the gradation by which adjustment may be made in changing frequencies in output signals. Calibration section 64 includes a reference signal source 86, frequency divider units 90, 92 and a frequency comparing unit 94. Reference signal source 86 is preferably embodied in a crystal. Frequency comparing unit 94 includes a frequency compare section 96 coupled with a digital-to-analog converter (DAC) value generator section 98.

A transmission modulating signal TXDATA is provided by microprocessor 84 at a terminal or pin 100. Microprocessor 84 also presents a signal FSK/OOK at a terminal 104 and presents a TX/RX signal at a terminal 106. Signal FSK/OOK indicates whether transceiver apparatus 55 is to operate in a frequency-shift keyed (FSK) mode or operate in an on-off keyed (OOK) mode. Signal TX/RX indicates whether transceiver apparatus 55 is to operate in a transmit (TX) mode or operate in a receive (RX) mode.

A selection switch 102 receives transmission modulating signal TXDATA, signal FSK/OOK and signal TX/RX. When signal FSK/OOK indicates operation in an FSK mode and signal TX/RX indicates transmitting operation, selection switch 102 is closed so that modulating signal TXDATA is applied to selection unit 80. Signal TX/RX indicating transmitting operation also sets a selection switch 110 to connect output signals from signal generating apparatus 62 to be applied to an FSK/OOK mode switch 112. FSK/OOK mode switch 112 includes selection switches 114, 116 that respond to signal FSK/OOK from terminal 104 indicating operation in an FSK mode to configure for passing output signals received from signal generating apparatus 62 via selection switch 110 to a power amplifier 118 and thence to a transmitter (not shown in FIG. 2) for effecting transmission of the output signals from transceiver apparatus 55.

Modulating signal TXDATA operates selection unit 80 to either (1) connect with digital-to-analog converter (DAC) 72 to receive a voltage at a level appropriate for signal controlled oscillator unit 82 to generate a signal having a frequency appropriate for signaling a "0"; or (2) connect with digital-to-analog converter (DAC) 76 to receive a voltage at a level appropriate for signal controlled oscillator unit 82 to generate a signal having a frequency appropriate for signaling a "1". Signal controlled oscillator unit 82 presents the appropriate signal (i.e., at a frequency indicating a "0" or a "1") to selection switch 110 for ultimate provision to a transmitter when signal TX/RX indicates transmitting operation.

Selection unit 80 is oriented in a normally open (NO) orientation with respect to connection with DAC 76 and in a normally closed (NC) orientation with respect to connection with DAC 72. When signal FSK/OOK indicates operation in OOK mode or when signal TX/RX indicates receiving operation, selection switch 102 is open so that modulating signal TXDATA is not applied to selection unit 80. In such conditions, selection unit 80 is connected by its normally closed orientation with DAC 72. When signal FSK/OOK from terminal 104 indicates operation in an OOK mode, selection switches 114, 116 in FSK/OOK mode switch 112 configure to operate in OOK mode. Voltage from DAC 72 via selection unit 82 drives signal controlled oscillator unit 82 to provide a signal to selection switch 114 via selection switch 110. When FSK/OOK mode switch 112 is configured to operate in OOK mode selection switch 114 is oriented to provide signals received from switch 110 to a modulating switch 120 and selection switch 116 is oriented to provide OOK modulated signals from modulating switch 120 to power amplifier 118 and thence to a transmitter (not shown in FIG. 2).

When signal TX/RX indicates receiving operation selection switch 102 is open (as indicated earlier herein) and selection switch 110 is configured for an RX operation so that signals from signal controlled oscillator unit 82 are provided to a receiver (not shown in FIG. 2).

A selection switch 130 responds to signal TX/RX indicating transmitting operation to close and provide signal from signal controlled oscillator unit 82 to calibrating section 64 for effecting calibrating operations. A timer signal may be set to close selection switch 130 after a predetermined interval to effect calibration operations, for example, to avoid frequency drift during a long transmission operation.

Calibrating unit 64 ascertains corrections required for reducing anomalies in output signals presented to selection switch 110 and provides digital adjustment signals to value storing units 66, 68 for carrying out those corrections. Value storing unit 66 receives digital adjustment signals from DAC value generator section 98 at deviation value storing unit 70. Deviation value storing unit 70 stores a deviation value for use by DAC 72 in generating a voltage value to be available for selection by selection unit 80 and provision to signal controlled oscillator unit 82. Value storing unit 68 receives digital adjustment signals from DAC value generator section 98 at deviation value storing unit 74. Deviation value storing unit 74 stores a deviation value for use by DAC 76 in generating a voltage value to be available for selection by selection unit 80 and provision to signal controlled oscillator unit 82. Output signals presented to selection switch 110 have a frequency representative of the then extant signal level of transmission modulating signal TXDATA.

Calibrating unit 64 receives signals produced by an external signal reference source 86 providing a frequency $f_{XTAL}$ to frequency divider unit 90. External signal reference source 86 may be embodied in a crystal. Frequency divider unit 90 is a divide-by-R frequency divider, where R is a scaling factor that scales the frequency $f_{XTAL}$ from external signal reference source 86 to result in a reference frequency $f_{REF}$. Calibrating unit 64 receives the output signal presented at selection switch 110 having an extant reference frequency $f_{OUT}$ at frequency divider unit 92. Frequency divider unit 92 is a divide-by-N frequency divider, where N is a scaling factor that scales the frequency $f_{OUT}$ of the output signal to substantially match reference frequency $f_{REF}$. Frequency divider units 90, 92 are programmable using, for example, programming signal PRGM from terminal 108 of microprocessor 84.

Frequency divider unit 90 provides a signal to frequency compare circuit 96 representing $f_{REF}$ which is an equivalent value of the value $f_{XTAL}/R$. Frequency divider unit 92 provides a signal to frequency compare circuit 96 representing $f_{OUT}/N$. Frequency compare circuit 96 compares signals $f_{XTAL}/R$, $f_{OUT}/N$ and presents an UP signal or a DOWN signal and a STEP signal to DAC value generator section 98.

An UP signal or a DOWN signal indicates which way frequency $f_{OUT}$ of the output signal must be adjusted for rendering an accurate representation of modulating signal TXDATA. A STEP signal indicates step size of a change indicated by an UP signal or a DOWN signal. DAC value generator section 98 provides a digital deviation correction signal to deviation value storing units 70, 74 as described earlier herein.

Calibration section 64 operates independently of frequency synthesizing section 62. Calibration section 64 only commences a calibration operation in response to a signal received from selection switch 130, as described earlier herein. Limiting time of operation of calibration section 64 reduces current used by signal generating apparatus 60, thereby reducing heat build-up and increasing efficiency of signal generating apparatus 60. Using signal reference source 86 (preferably embodied in a crystal) only as a reference for calibration purposes means that no precision capacitor network is required to draw the crystal off-frequency and no precision crystal is required for reliable accurate operation of signal generating apparatus 60. Costs for manufacturing signal generating apparatus 60 are therefore kept down. Using digital signaling for effecting frequency corrections permits independent operation of frequency synthesizing section 62 and calibration section 64.

Figure 3:
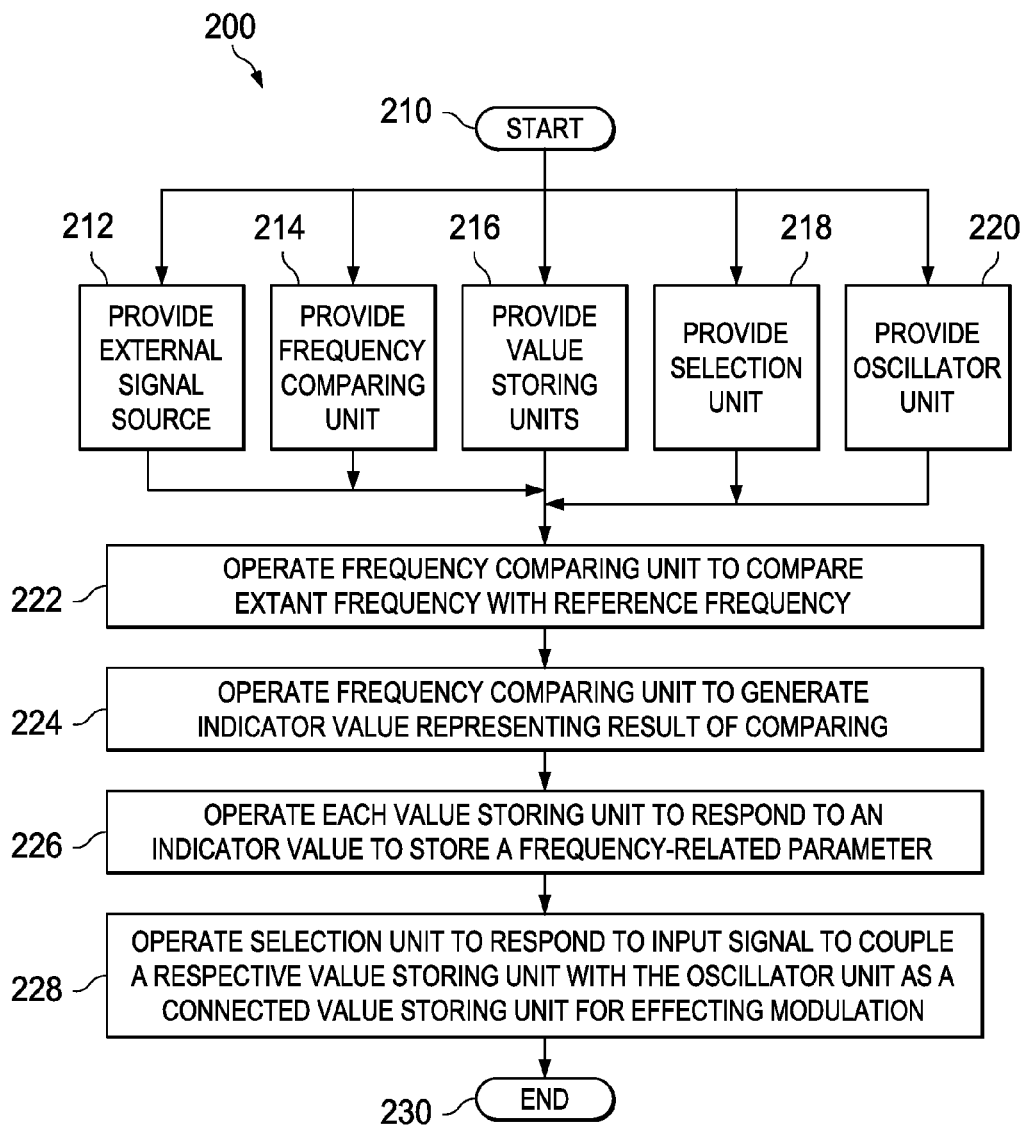
FIG. 3 is a flow diagram illustrating the method of the present invention.

FIG. 3 is a flow diagram illustrating the method of the present invention. In FIG. 3, a method 200 for generating an output signal at an output locus begins at a START locus 210. The output signal is modulated by at least one characteristic of an input signal received at an input locus. The output signal has an extant frequency that is selected from a plurality of predetermined frequencies to indicate the at least one characteristic. Method 200 continues with the step of, in no particular order; (1) providing a signal source for providing a reference signal at a reference frequency, as indicated by a block 212; (2) providing a frequency comparing unit coupled with the signal source and coupled with the output locus, as indicated by a block 214; (3) providing a plurality of value storing units coupled with the frequency comparing unit, as indicated by a block 216; (4) providing a selection unit coupled with the input locus and coupled with selected respective value storing units of the plurality of value storing units, as indicated by a block 218; and (5) providing a signal controlled oscillator unit coupled with the selection unit and coupled with the output locus, as indicated by a block 220.

Method 200 continues with the step of operating the frequency comparing unit to compare the extant frequency with the reference frequency, as indicated by a block 222.

Method 200 continues with the step of operating the frequency comparing unit to generate at least one indicator value representing a result of the comparing, as indicated by a block 224.

Method 200 continues with the step of operating each respective value storing unit of the plurality of value storing units to respond to a respective indicator value of the at least one indicator value to store a respective frequency-related parameter associated with a respective predetermined frequency of the plurality of predetermined frequencies, as indicated by a block 226.

Method 200 continues with the step of operating the selection unit to respond to the at least one characteristic to couple a selected the respective value storing unit with the signal controlled oscillator unit as a connected value storing unit; the connected value storing unit providing a respective the frequency-related parameter to the signal controlled oscillating unit for effecting the modulation, as indicated by a block 228. Method 200 terminates at an END locus 230.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims:

I claim:

1. A signal generating apparatus for presenting an output signal at an output locus; said output signal being modulated by at least one characteristic of an input signal received at an input locus; said output signal having an extant frequency; said extant frequency being selected from a plurality of predetermined frequencies to indicate said at least one characteristic; the apparatus comprising:
   (a) a signal source; said signal source providing a reference signal at a reference frequency;
   (b) a frequency comparing unit coupled with said signal source and coupled with said output locus; said frequency comparing unit comparing a presently extant frequency of said output signal with said reference frequency; said frequency comparing unit generating at least one indicator value representing a result of said comparing;
   (c) a plurality of value storing units coupled with said frequency comparing unit; each respective value storing unit of said plurality of value storing units responding to a respective indicator value of said at least one indicator value to store a respective frequency-related parameter associated with a respective predetermined frequency of said plurality of predetermined frequencies;
   (d) a selection unit coupled with said plurality of value storing units and coupled with said input locus; and
   (e) a signal controlled oscillator unit coupled with said selection unit and coupled with said output locus;
said selection unit responding to said at least one characteristic to couple a selected said respective value storing unit with said signal controlled oscillator unit as a connected value storing unit; said connected value storing unit providing a respective said frequency-related parameter to said signal controlled oscillating unit for effecting said modulation.

2. A signal generating apparatus for presenting an output signal at an output locus as recited in claim 1 wherein said plurality of predetermined frequencies is two predetermined frequencies.

3. A signal generating apparatus for presenting an output signal at an output locus as recited in claim 2 wherein output signal is a frequency-shift keyed signal.

4. A signal generating apparatus for presenting an output signal at an output locus as recited in claim 1 wherein said respective said indicator values are digital signals and wherein said plurality of value storing units is a plurality of memory units, each respective memory unit of said plurality of memory units having an associated digital-to-analog converting unit.

5. A signal generating apparatus for presenting an output signal at an output locus as recited in claim 2 wherein said respective said indicator values are digital signals and wherein said plurality of value storing units is a plurality of memory units, each respective memory unit of said plurality of memory units having an associated digital-to-analog converting unit.

6. A signal generating apparatus for presenting an output signal at an output locus as recited in claim 3 wherein said respective said indicator values are digital signals and wherein said plurality of value storing units is a plurality of memory units, each respective memory unit of said plurality of memory units having an associated digital-to-analog converting unit.

7. A signal generating apparatus for presenting an output signal at an output locus as recited in claim 1 wherein said at least one indicator value is updated when said input signal is reapplied to said input locus after an interruption.

8. A signal generating apparatus for presenting an output signal at an output locus as recited in claim 1 wherein said at least one indicator value is updated periodically at predetermined time intervals.

9. A signal generating apparatus for presenting an output signal at an output locus as recited in claim 3 wherein said at least one indicator value is updated when said input signal is reapplied to said input locus after an interruption.

10. A signal generating apparatus for presenting an output signal at an output locus as recited in claim 3 wherein said at least one indicator value is updated periodically at predetermined time intervals.

11. A signal generating apparatus for presenting an output signal at an output locus as recited in claim 6 wherein said at least one indicator value is updated when said input signal is reapplied to said input locus after an interruption.

12. A signal generating apparatus for presenting an output signal at an output locus as recited in claim 6 wherein said at least one indicator value is updated periodically at predetermined time intervals.

13. An apparatus for presenting an output signal at an output locus; said output signal being modulated by at least one characteristic of an input signal received at an input locus; said output signal having a first frequency or a second frequency in response to said modulation; the apparatus comprising:
   (a) a signal modulation section; said signal modulation section including:
      (1) an oscillator unit responding to at least one drive signal for providing said output signal to said output locus; and
      (2) a modulator unit coupled with said input locus and coupled with said oscillator unit; and
   (b) a calibration section; said calibration section including:
      (1) a signal source; said signal source providing a reference signal at a reference frequency;
      (2) a frequency comparing unit coupled with said signal source and coupled with said output locus; said frequency comparing unit comparing said extant frequency of said output signal with said reference frequency; said frequency comparing unit generating at least one digital adjustment value indicating a result of said comparing;

(3) a plurality of value storing units coupled with said frequency comparing unit; each respective value storing unit of said plurality of value storing units storing a respective stored digital indicator value of said at least digital one indicator value; each said respective value storing unit presenting a respective analog frequency-related parameter based on said respective stored digital indicator value; each said respective analog frequency-related parameter being associated with one of said first frequency and said second frequency; said plurality of value storing units being coupled with said modulator unit;

said modulator unit responding to said input signal for effecting said modulation by selecting at least one said respective value storing unit for providing a respective said analog frequency-related parameter for providing said at least one drive signal to said oscillator unit.

14. An apparatus for presenting an output signal at an output locus as recited in claim 13 wherein output signal is a frequency-shift keyed signal.

15. A signal generating apparatus for presenting an output signal at an output locus as recited in claim 13 wherein said at least one indicator value is updated when said input signal is reapplied to said input locus after an interruption.

16. A signal generating apparatus for presenting an output signal at an output locus as recited in claim 15 wherein said at least one indicator value is updated periodically at predetermined time intervals.

17. A signal generating apparatus for presenting an output signal at an output locus as recited in claim 14 wherein said at least one indicator value is updated when said input signal is reapplied to said input locus after an interruption.

18. A signal generating apparatus for presenting an output signal at an output locus as recited in claim 14 wherein said at least one indicator value is updated periodically at predetermined time intervals.

19. A method for generating an output signal at an output locus; said output signal being modulated by at least one characteristic of an input signal received at an input locus; said output signal having an extant frequency; said extant frequency being selected from a plurality of predetermined frequencies to indicate said at least one characteristic; the method comprising the steps of:

(a) in no particular order;
        (1) providing a signal source for providing a reference signal at a reference frequency;
        (2) providing a frequency comparing unit coupled with said signal source and coupled with said output locus;
        (3) providing a plurality of value storing units coupled with said frequency comparing unit;
        (4) providing a selection unit coupled with said input locus and coupled with selected respective value storing units of said plurality of value storing units; and
        (5) providing a signal controlled oscillator unit coupled with said selection unit and coupled with said output locus;
    (b) operating said frequency comparing unit to compare said extant frequency with said reference frequency;
    (c) operating said frequency comparing unit to generate at least one indicator value representing a result of said comparing;
    (d) operating each respective value storing unit of said plurality of value storing units to respond to a respective indicator value of said at least one indicator value to store a respective frequency-related parameter associated with a respective predetermined frequency of said plurality of predetermined frequencies; and
    (e) operating said selection unit to respond to said at least one characteristic to couple a selected said respective value storing unit with said signal controlled oscillator unit as a connected value storing unit; said connected value storing unit providing a respective said frequency-related parameter to said signal controlled oscillating unit for effecting said modulation.

20. A method for generating an output signal at an output locus as recited in claim 19 wherein said respective said indicator values are digital signals; wherein said plurality of value storing units is a plurality of memory units, each respective memory unit of said plurality of memory units having an associated digital-to-analog converting unit; and wherein said at least one indicator value is updated when said input signal is reapplied to said input locus at the earlier occurrence of an interruption or an elapsing of a predetermined time interval.

* * * * *